Jan. 15, 1924.
T. ANDERSON
SAW SET
Filed May 13, 1922
1,481,175
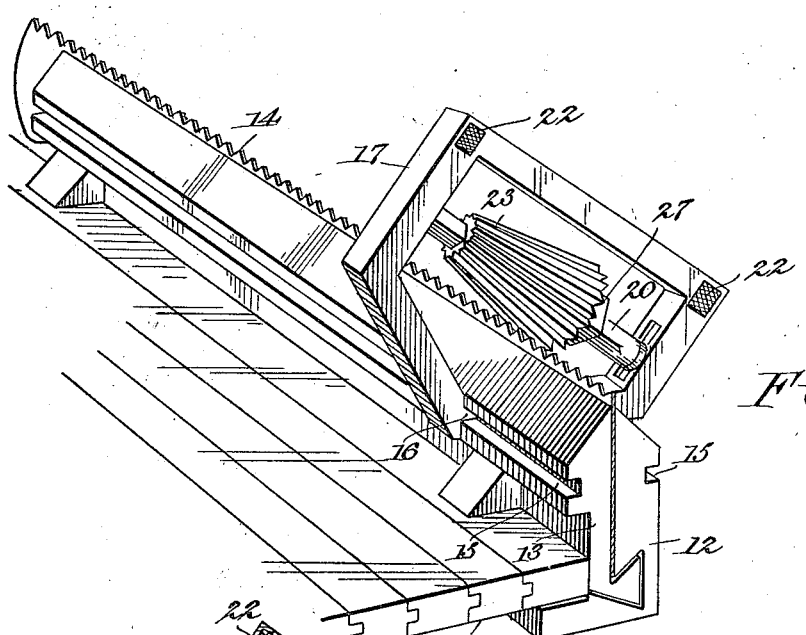
*Fig.1.*
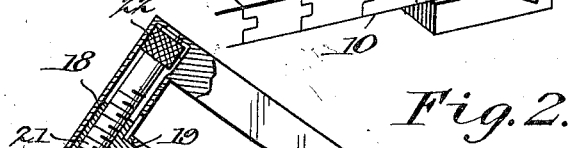
*Fig.2.*
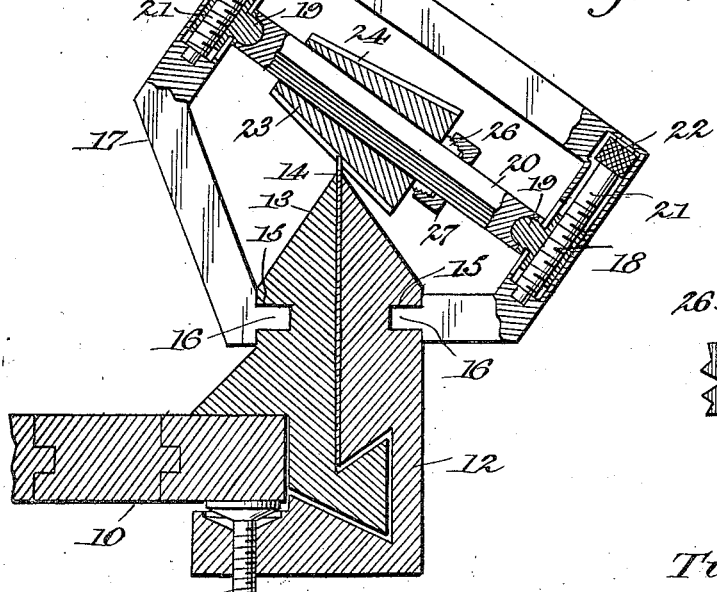
*Fig.3.*
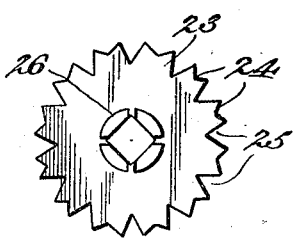
Tim Anderson,
INVENTOR
BY Victor J. Evans
ATTORNEY
WITNESS: Fred M. Ely, Patented Jan. 15, 1924.

1,481,175

UNITED STATES PATENT OFFICE.

THEIMAN ANDERSON, OF DEMAREST, NEW JERSEY.

SAW SET.

Application filed May 13, 1922. Serial No. 560,643.

*To all whom it may concern:*

Be it known that I, THEIMAN ANDERSON, a citizen of the United States, residing at Demarest, in the county of Bergen and State of New Jersey, have invented new and useful Improvements in Saw Sets, of which the following is a specification.

This invention relates to devices for setting the teeth of saws, and one of the principal objects is to produce a device of this nature which may be readily adjusted for accommodating itself to different size teeth.

Another object is to produce a device of this nature which may be readily adjusted to effect different degrees of setting or bending of the teeth.

Another object is to produce a device of this nature which shall be simple of construction, consisting of few parts, cheap to manufacture, and highly efficient for the purpose for which it is devised.

With these and other objects in view, the invention resides in certain novel construction and combination and arrangement of parts, the essential features of which are hereinafter fully described, are particularly pointed out in the appended claims, and are illustrated in the accompanying drawing, in which:—

Figure 1 is a perspective view of my improved saw setting device.

Figure 2 is a vertical sectional view of the same.

Figure 3 is a detail view of the saw setting comb.

Like characters of reference refer to like parts in all views.

Referring to the drawing in detail, 10 represents a table or bench to which the device may be secured by means of hand screws 11 or the like. The device proper includes a device comprising two chair members 12 and 13 which are adapted to support the saw between them, the saw being indicated at 14. The chair members are provided with ways 15 in which travel tongues 16 extended through opposite sides of the main frame 17 as shown in the drawing.

Slidably mounted in the main frame 17 are members 18 each of which is provided with a bearing head 19. Rotatably supported by the bearing heads 19 is a square shaft 20. Each of the members 18 is mounted on an adjusting screw 21 which is operable by a knurled finger 22 to adjust the member 18 so as to change the angular relation of the saw setting comb about to be described with relation to the teeth of the saw, whereby the degree of set to which will be given the teeth may be regulated.

As above stated the rod 20 is square in cross section and a conical member 23 is slidably mounted thereon. This member 23 is provided with teeth 24 intervened by a space 25 so that as the comb is rolled along the saw it will engage and bend every other tooth. At the end, the comb is provided with fingers 26 which are formed with screw threads, and a conically concaved and interiorly threaded nut 27 may be screwed on to the fingers 26 so as to force them into engagement with the shaft 20, and thereby lock the comb 23 in any desired position on the shaft 20.

While I have described what I deem to be the most desirable embodiment of my invention, it is obvious that many of the details may be varied without in any way departing from the spirit of my invention, and I therefore do not limit myself to the exact details of construction herein set forth nor to anything less than the whole of my invention limited only by the appended claims.

What is claimed as new is:—

1. In a device of the class described, the combination of a saw holding device, a frame movable therealong, a saw set member, and means for adjusting said saw setting member in accordance with the size of teeth to be operated upon and the degree of set to be imparted thereby, said means including adjustable bearing members supported by said frame and a shaft rotatably mounted on said bearing members for supporting said saw set member.

2. In a device of the class described, the combination of a means for holding a saw to be set, a frame slidably mounted on said means, bearing members adjustably mounted on said frame, a shaft rotatably mounted on said bearing members, and a saw setting means adjustably mounted on said shaft for turning movement therewith.

3. In a device of the class described, the combination of means for holding a saw to be set, a frame movably mounted on said means, adjustable bearing members supported by said frame, a shaft rotatably mounted on said bearing members, and a saw setting comb slidably mounted on said shaft.

4. In a device of the class described, the combination of means for holding a saw to be set, a frame movably mounted on said means, adjustable bearing members supported by said frame, a shaft rotatably mounted on said bearing members, a saw setting comb slidably mounted on said shaft, and means for securing said comb in any desired adjusted position on said shaft.

5. In a device of the class described, the combination of a means for holding a saw to be set, said means being detachably connected with a support, a frame mounted for movement along the length of said means, saw setting means, and means for adjustably mounting said saw setting means in said frame at an angle with respect to the horizontal plane of movement of said frame.

In testimony whereof I have affixed my signature.

TIM ANDERSON.

Witness:
J. MARSHALL GORHAM.